United States Patent
Takeshima et al.

(10) Patent No.: US 7,678,733 B2
(45) Date of Patent: *Mar. 16, 2010

(54) METHOD FOR PRODUCING HEAT-RESISTING COMPOUND OXIDES

(75) Inventors: Shinichi Takeshima, Numazu (JP); Akio Koyama, Yokohama (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 67 days.

This patent is subject to a terminal disclaimer.

(21) Appl. No.: 11/918,484

(22) PCT Filed: Apr. 7, 2006

(86) PCT No.: PCT/JP2006/307887

§ 371 (c)(1), (2), (4) Date: Oct. 15, 2007

(87) PCT Pub. No.: WO2006/112375

PCT Pub. Date: Oct. 26, 2006

(65) Prior Publication Data

US 2009/0048101 A1    Feb. 19, 2009

(30) Foreign Application Priority Data

Apr. 18, 2005 (JP) ............................ 2005-120332

(51) Int. Cl.
    *B01J 23/10* (2006.01)
(52) U.S. Cl. .................................. 502/304
(58) Field of Classification Search .................. 502/304
    See application file for complete search history.

(56) References Cited

U.S. PATENT DOCUMENTS

| 4,206,186 A | 6/1980 | Holter et al. |
| 5,242,674 A | 9/1993 | Bruno et al. |
| 5,254,797 A * | 10/1993 | Imoto et al. .............. 423/240 S |
| 5,753,581 A | 5/1998 | Beckmeyer et al. |

(Continued)

FOREIGN PATENT DOCUMENTS

EP    1 415 956 A2    5/2004

(Continued)

OTHER PUBLICATIONS

T. Masui et al. "Characterization and Catalytic Properties of $CeO_2$—$ZrO_2$ Ultrafine Particles Prepared by the Microemulsion Method," Journal of Alloys and Compounds, vol. 269, (1998) pp. 116-122.

(Continued)

*Primary Examiner*—Melvin C Mayes
*Assistant Examiner*—Michael Forrest
(74) *Attorney, Agent, or Firm*—Oliff & Berridge, PLC

(57) ABSTRACT

A method for producing a heat-resisting compound oxide in which first oxide particles are made to carry second fine particles having near charging characteristics. Said first oxide particles or their precursors are caused, before said first oxide particles or their precursors are caused to adsorb said first oxide particles or their precursors, to adsorb a predetermined acid or base so that they may be charged inversely of said second fine particles or their precursors to be adsorbed thereby. Said first oxide particles are caused to adsorb said second fine particles through said acid or base and are sintered to carry the same.

6 Claims, 4 Drawing Sheets

U.S. PATENT DOCUMENTS

| | | | |
|---|---|---|---|
| 6,083,467 | A | 7/2000 | Takeshima et al. |
| 6,276,132 | B1 | 8/2001 | Kanesaka et al. |
| 6,753,351 | B2 | 6/2004 | Clark et al. |
| 7,294,604 | B2 | 11/2007 | Dath et al. |
| 2003/0109588 | A1* | 6/2003 | Schmidt et al. ............... 516/20 |
| 2004/0087440 | A1 | 5/2004 | Kuno |
| 2004/0171483 | A1 | 9/2004 | Takeshima |
| 2004/0234439 | A1* | 11/2004 | Takeshima et al. .......... 423/263 |
| 2005/0014000 | A1 | 1/2005 | Bringley et al. |

FOREIGN PATENT DOCUMENTS

| | | |
|---|---|---|
| EP | 1 452 483 A1 | 9/2004 |
| EP | 1 479 651 A1 | 11/2004 |
| JP | A-05-261287 | 10/1993 |
| JP | A-07-246343 | 9/1995 |
| JP | A-08-017942 | 1/1996 |
| JP | A-2000-197822 | 7/2000 |
| WO | WO 02/094716 A1 | 11/2002 |

OTHER PUBLICATIONS

New U.S. Patent Application in the name of Shinichi Takeshima et al.
New U.S. Patent Application in the name of Shinichi Takeshima et al.
U.S. Appl. No. 10/786,046, filed Feb. 26, 2004 in the name of Shinichi Takeshima.
U.S. Appl. No. 11/542,206, filed Oct. 4, 2006 in the name of Shinichi TAKESH1MA.
U.S. Appl. No. 11/631,174, filed Dec. 29, 2006 in the name of Shinichi Takeshima et al.
U.S. Office Action for copending U.S. Appl. No. 11/918,543 dated Dec. 8, 2009.

* cited by examiner

METHOD FOR PRODUCING HEAT-RESISTING COMPOUND OXIDES

TECHNICAL FIELD

This invention relates to a method for producing a compound oxide to be employed as a catalyst or the like to purify the exhaust gas of an internal combustion engine.

BACKGROUND ART

The compound oxide is an oxide in the form of a compound of two or more kinds of metal oxides, and has no ion of oxo-acid as the unit of a constitution. One important application of the compound oxide is a catalyst and a catalyst carrier. A known catalyst has a constitution, in which catalytically active fine particles are carried on the heat-resisting carrier and used for purifying the exhaust gas of the internal combustion engine.

A variety of methods are known for producing the aforementioned catalytically active fine particles or carriers, and the method for carrying the fine particles on the carrier is described in Japanese Patent Publication No. 08-17942 or Japanese Patent Laid-Open No. 2000-197822.

The aforementioned method described in Japanese Patent Publication No. 08-17942 can be called the water-absorption carriage method. This method comprises: preparing heat-resisting powder carrying a precious metal, a perovskite type compound oxide and a heat-resisting carrier; preparing slurry containing the heat-resisting powder carrying the precious metal and the perovskite type compound oxide; applying the slurry to the heat-resisting carrier; and then drying and sintering the slurry.

On the other hand, the method described in Japanese Patent Laid-Open No. 2000-197822 can be called the impregnation carriage method. This method comprises: adding carrier powder to a solution of salt containing a metal composing a compound oxide; evaporating and drying the solution into a solid; and then sintering the solid.

In either of the methods, however, water-soluble salt such as water-soluble nitrate is dissolved and absorbed by the carrier already prepared, and is then dried and sintered. In this process, the carrier may be partially dissolved to have its heat resistance lowered, and the compound oxide obtained may be thermally deteriorated.

DISCLOSURE OF THE INVENTION

This invention has been conceived noting the aforementioned technical problems, and has an object to provide a highly heat-resisting compound oxide by dispersing second oxide particles homogeneously and adhering the second oxide particles densely to a first oxide when the second oxide particles are to be carried on the first oxide.

In order to achieve the aforementioned object, according to this invention, there is provided a method for producing a heat-resisting compound oxide in which first oxide particles are made to carry second fine particles having near charging characteristics. The heat-resisting compound oxide producing method is characterized: in that said first oxide particles or their precursors are caused, before said first oxide particles or their precursors are caused to adsorb said first oxide particles or their precursors, to adsorb a predetermined acid or base so that they may be charged inversely of said second fine particles or their precursors to be adsorbed thereby; and in that said first oxide particles are caused to adsorb said second fine particles through said acid or base and are sintered to carry the same. Here, the charging characteristics are surface potentials against a pH value, and the closeness to the charging characteristics is that the surface potentials at every pH values are close to one another.

According to this invention, moreover, the method is characterized in that said acid is an organic acid; and in that said base is an organic base.

According to this invention, still moreover, the method is characterized: in that said first oxide particles or their precursor particles are synthesized in micelles having an aqueous phase therein and dispersed in a solvent; in that an acid or a base is then adsorbed in the micelles by said synthesized particles thereby to charge said first oxide particles or their precursor particles into a polarity inverse to that of said second fine particles or their precursors to be adsorbed thereby; and in that said second fine particles or their precursor particles are synthesized in said micelles so that the second fine particles are adsorbed on the firsts oxide particles.

According to this invention, even if the charging characteristics between the first oxide particles or their precursor (as these will also be merely called the first oxide particles) and the second oxide particles or their precursor (as these will also be merely called the second oxide particles) are similar, an acid or the organic acid or a base such as the organic base is adsorbed in advance so that its potential is adjusted to the potential inverse to that of the second fine particles to be adsorbed. After all, the second fine particles are adsorbed onto the surfaces of the first oxide particles by the electric attraction. If, in this case, the so-called unadsorbed portions on the surfaces of the first oxide particles, their electric actions adsorb the second fine particles so that the second fine particles can be densely and homogeneously adsorbed and carried on the surfaces of the first oxide particles. Since these attractions can be performed in the procedure or after the synthesizations of the individual particles, the thermal deterioration of the first oxide particles to become the carrier can be suppressed, and the second fine particles remain stable even if exposed to a high temperature. In this regard, therefore, the thermal deterioration can be suppressed to provide a composite oxide having an excellent heat resistance as a whole.

According to the invention, moreover, the first oxide particles to become the carrier are synthesized in the micelles of the microemulsion liquid, and the primary particles or the precursors of the first oxide particles are produced at first and are agglomerated to form the secondary particles, and these secondary particles agglomerate to increase their particle diameter. The first oxide particles thus synthesized or their precursors are adjusted by the acid or base into the surface potential inverse to that of the second fine particles. As a result, the second fine particles mixed into or synthesized in the micelles are adsorbed on the surfaces of the first oxide particles due to the difference in the surface potential so that effects similar to the aforementioned ones can be attained.

BEST MODE FOR CARRYING OUT THE INVENTION

Figure 1:
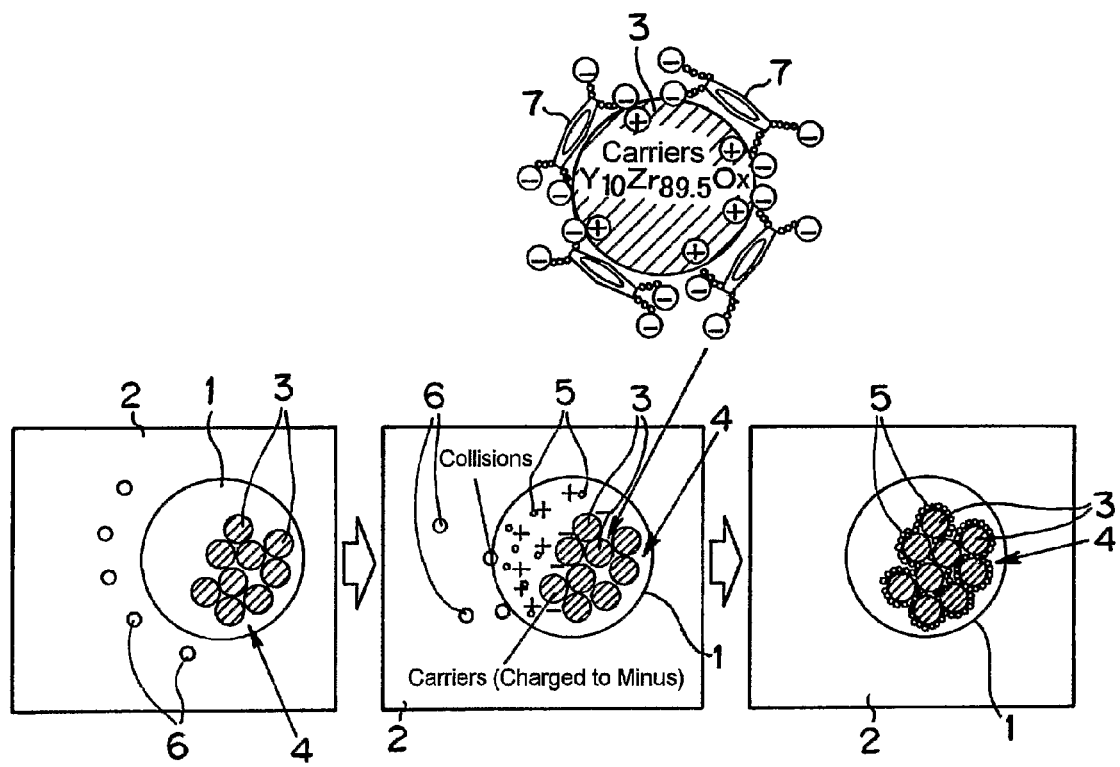
FIG. 1 is a diagram schematically showing a procedure in one example of a method of the invention for adsorbing second oxide particles onto first oxide particles.

This invention relates to a method for producing a compound oxide, in which first oxide particles carry second fine particles containing ultrafine particles having a smaller diameter than that of first oxide particles. The compound oxide is exemplified by that which can be used as a catalyst for purifying a burned exhaust gas, and its first oxide to act as a carrier is a porous substance having pores of a predetermined diameter. It is preferred that the pores are mesopores having diameters belonging to the so-called mesorange of about 10 to 100 nm.

As the first oxide to become the carrier, specifically, there can be adopted zirconia, alumina, silica-alumina, a lanthanum-yttrium-zirconium compound oxide, a yttria-zirconia composite oxide, a lathanum-zirconium compound oxide, a cerium-zirconium composite oxide or the like. The particles of this first oxide have such a porous structure as is obtained, for example, by causing secondary particles of an agglomeration of primary particles produced by a hydrolysis to further agglomerate.

The method for producing the porous structure may be exemplified by ones known in the prior art. Of these methods, the microemulsion method utilizing a microemulsion is preferred, in which micelles (or inverse micelles) having an aqueous phase inside are dispersed in an organic solvent (i.e., oil). This is specifically explained in the following. At first, the primary particles of the first oxide or its precursor for the carrier are produced and are made to agglomerate to produce the secondary particles, and these secondary particles are made to agglomerate to each other. However, the agglomeration of the secondary particles is suppressed till the secondary particles grow to a size of some extent. In order to suppress the fusion (or coalescence) of the inverse micelles till the secondary particles grow, there can be adopted a method for enlarging the spacing between the inverse micelles by lowering the density of the aqueous phase, a method for suppressing the fusion (or coalescence) of the inverse micelles with electric repulsions by the cations (excepting hydrogen ions) in the inverse micelles, and so on.

In case the compound oxide is to be produced by the microemulsion method, a solution, which is prepared by dissolving a compound of a first metallic element hydrolyzed to make a hydroxide or an oxide in an organic solvent, and an emulsion, which contains ions of second and subsequent metallic elements in an aqueous phase inside of the inverse micelles made by a surfactant in an organic solvent, are mixed with each other to hydrolyze the compound of the first metallic element in the interfaces of the inverse micelles and to introduce the second and subsequent metallic elements thereby to condense and polymerize the primary particles of a precursor of the compound oxide.

If the compound of the metallic element, which is hydrolyzed to make the hydroxide, is called the metallic compound, the metal to make the metallic compound means not a metal in a narrow sense but generally an element M capable of making an M-O-M bond.

As this metallic compound, it is possible to employ the metallic compound which is generally used in the so-called sol-gel method. This metallic compound can be exemplified by a metal alkoxide, an acetylaceton metallic complex, metal carboxylate, a metallic inorganic compound (e.g., nitrate, oxychloride or chloride), or the like.

The metallic element M to make metallic alkoxide involves elements of the first group to the fourteenth group, sulfur, selenium and tellurium of the sixteenth group, and phosphorous, arsenic, antimony and bismuth of the fifteenth group, but it is said that the platinum-group elements or some lanthanide elements do not make the alkoxides. For example, the silicon alkoxide or the germanium alkoxide are called the metal alkoxide. The metal alkoxide is easily available, because various alkoxides are sold on the market and because their producing method is well known in the art.

The hydrolyses of metallic alkoxides M(OR)n (wherein: M designates a metal; and R designates an alkyl radical such as methyl, ethyl, propyl or butyl) are also known, and are formally expressed by:

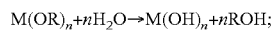

and then $M(OH)_n \rightarrow MO_{n/2} + n/2H_2O$.

The hydrolyses of acetylaceton metal complex $(CH_3COCH_2COCH_3)_nM$ (wherein M designates a metal), and is expressed by:

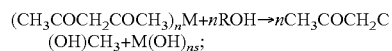

and then

The acetylaceton metal complex is easily available, because various metal complexes are sold on the market and because their producing method is well known in the art. The acetylaceton metal complex is represented by aluminum acetonate, barium acetonate, lanthanum acetonate, platinum acetonate or the like, and has more kinds than those of alkoxides.

The organic metallic compound such as the metal alkoxide or the acetylaceton metallic compound is easily dissolved by selecting a proper solvent from alcohol, a polar organic solvent or a hydrocarbon solvent. It is preferred that a hydrophobic (or oily) organic solvent to be separated into two phases from the aqueous phase is used as the solvent of this invention.

The organic solvent is exemplified by hydrocarbons such as cyclohexane or benzene, straight-chain alcohol such as hexanol, ketone such as acetone and so on. The standards for selecting the organic solvent involve not only the solution of the surfactant but also the area for forming microemulsion (i.e., the magnitude of the molar ratio of water to surfactant).

It is known that the hydrolytic reaction of the organic metallic compound starts and proceeds when water is added to an organic phase, in which a compound of a metallic element hydrolyzed to produce a hydroxide or oxide is dissolved. Generally, the metallic hydroxide or metallic oxide can be obtained by adding water to the organic phase having the metallic compound dissolved therein and by agitating the organic phase.

In case the compound oxide is to be produced by the microemulsion method, there is formed an water-in-oil type emulsion which contains the ions of the second and subsequent metallic element in the aqueous phase of the inverse micelles dispersed finely with the surfactant in the organic phase. This emulsion is caused, when the solution of the first metallic compound is added to and mixed with the emulsion by mixing it, to react with the ions of the second and subsequent metallic elements so that it is hydrolyzed. According to this method, it is thought that the fine particles can be obtained because the inverse micelles act as reaction nuclei or because the surfactant stabilizes the fine particles of the hydroxide produced.

In the aforementioned hydrolytic reaction, it is also known that a plurality of metallic compounds are hydrolyzed, when made to contact with water, by dissolving the metallic compounds in the organic phase, so that a plurality of metallic hydroxides are simultaneously produced.

In this invention, one kind (involving the first element) of the hydrolytic metallic compounds is made to exist in the organic phase, and the second metallic element and the third and subsequent metallic elements are made to exist as ions in the aqueous phase in the inverse micelles when the organic phase and the aqueous phase contact with each other.

The existence of the ions in the aqueous phase can be caused by using water-soluble metallic salts, especially inorganic salts such as nitrate or chloride, and organic salts such as acetate, lactate or oxalate. The ions of the second element existing in the aqueous solution may be not only single ions but also complex ions containing the second element. The ions may also be those of the third and subsequent ones.

When the organic phase and the aqueous phase are brought into contact, the organic metallic compounds in the organic phase come into contact with water so that they cause the hydrolytic reactions to produce the hydroxides or oxides the metal. In the microemulsion method, it has been found that the ions of the metal existing in the aqueous phase are incorporated into the hydroxide (or oxide) of the aforementioned metal or the hydrolyzed product. This phenomenon is not known in the prior art. The reason why the ions in the aqueous phase are incorporated into the hydroxides even without any special sedimentation is not sufficiently clarified yet, but is described on the case, in which the metallic compound is alkoxide. It is thought that, when the alkoxide is hydrolyzed, other metallic ions in the aqueous phase induce alkoxide so that the hydrolysis advances, or that the fine hydroxides of the alkoxide hydrolyzed trap and agglomerate the metallic ions of a predetermined quantity in the aqueous phase.

In the aforementioned method, it is preferred that the reaction system is the water-in-oil type emulsion system or the microemulsion system. In this case, it is thought that the method can attain a high hydrolyzing rate firstly due to an extremely small diameter of several nm to several tens nm of the inverse micelles and a remarkably large area (about 8,000 $m^2/l$ in the case of the diameter of 10 nm) of the interface between the organic phase-the aqueous phase, and a homogenization effect secondly due to the fact that the aqueous phase is finely dispersed so that metallic ions of an extremely small number (about 100 ions) are contained each inverse micelle.

On the other hand, the aqueous phase in the inverse micelles is the so-called reaction field to cause the production of the primary particles, the production of the secondary particles due to the agglomeration of the primary particles and the mutual agglomeration of the secondary particles. Therefore, the size of the inverse micelles influences the pores to be formed when the secondary particles agglomerate and the porous structure of the compound oxides due to the agglomeration. Considering this point, it is preferred in this invention that the diameter of the aqueous phase of the inverse micelles is preferred to be 20 nm or more.

The method for producing the emulsion group or the microemulsion group of the water-in-oil type is known. As the organic phase medium, there can be employed hydrocarbons such as cyclohexane or benzene, straight-chain alcohol such as hexanol, ketone such as acetone, or the like similar to the aforementioned organic solvents. The surfactant to be used in this invention extends over various kinds such as a nonionic-group surfactant, an anion-group surfactant or a cation-group surfactant, and can be employed in combination with the organic phase components conforming to the applications.

As the surfactant of the nonionic group, there can be used a polyoxyethylene ethylene nonylphenyl ether group represented by polyoxyethylene (n=5) nonylphenyl ether, a polyoxyethylene octylphenyl ether group represented by polyoxyethylene (n=10) octylphenyl ether, a polyoxyethylene alkylether group surfactant represented by polyoxyethylene (n=7) cetyl ether, and a polyoxyethylene sorbitan group surfactant represented by polyoxyethylene sorbitan trioleate.

The anion-group surfactant can be exemplified by di-2-ethylene hexylsulfur sodium succinate, and the cation-group surfactant can be exemplified by cetyl trimethyl ammonium chloride or cetyl trimethyl ammonium bromide.

In case a compound oxide of three or more elements is to be produced, according to the invention, the third and subsequent elements are made to exist in the aqueous phase in the inverse micelles. This is because a plurality of hydrolytic metallic compounds are different, if any in an organic phase, in stability in the organic phase so that the products are heterogeneous. Despite of this phenomenon, however, the aforementioned metal element and others have to be homogeneous, but the metallic compound of the third element may exist in the organic phase if the homogeneity between that metallic element and the third metallic element is not important.

The inverse micelles of said other metallic element can be produced by an injection method, in which the aforementioned surfactant is dissolved in the aforementioned organic phase medium, and in which aqueous solution containing the ions of another metallic element is added to the solution and agitated.

Thus, the solution of the aforementioned metallic compound and the inverse micelles containing the ions of that another metallic element in the aqueous phase are made to contact so that the primary particles of the precursor of the composite oxide corresponding to the first oxide particles in the invention and containing the aforementioned metallic element and another metallic element are formed by hydrolysis. After this, the system containing those primary particles is left aside to age for a predetermined time period (e.g., two hours) at a predetermined temperature (e.g., 30° C. to 80° C.). At this aging step, the primary particles agglomerate to form the secondary particles. At this time, all the primary particles are agglomerated to form not the large secondary particles but relatively small secondary particles and then pores of sufficient sizes between the secondary particles so that the hydrolysis may proceed to agglomerate the secondary particles while preventing or suppressing the fusion (or coalescence) and so that the primary particles and the secondary particles may age.

According to the method of this invention, on the other hand, the secondary particles thus synthesized are used as the first oxide particles. These second oxide particles are caused to adsorb the fine particles of the second oxide particles, and are sintered to carry the fine particles. These second fine particles can be called the ultrafine particles having smaller diameters (e.g., several nm) than those of the first oxide particles. In this invention, the second oxide particles can be exemplified by a perovskite type lanthanum-strontium-iron-zirconium composite oxide, a silica-titania composite oxide, a fluorite type lanthanum-cerium compound oxide or the like. These second oxide particles or their precursors (as both of them may be called the fine particles or ultrafine particles) may be mixed with the aforementioned first oxide particles or their precursors (as both of them may be called the first oxide particles) synthesized in advance, and may be adsorbed by the first oxide particles. Alternatively, the second oxide particles may also be produced in the reaction field, where the aforementioned first oxide particles are synthesized, so that they may be adsorbed by the first oxide particles simultaneously with the synthesization of the second fine particles.

The method of this invention is characterized in the method for adsorbing the aforementioned second fine particles in the first oxide particles to become the carrier. In the method of this invention, more specifically, the second fine particles are adsorbed and carried by the first oxide particles of similar charging characteristics, and the potentials (or the zeta-potentials) of the surfaces of the individual particles are adjusted to the potentials inverse to each other so that the second fine particles are adsorbed in the surfaces of the first oxide particles by the electrically attractive forces. Here, the charging characteristics are surface potentials against a pH value, and the closeness to the charging characteristics is that the surface potentials at every pH values are close to one another. The adjustments of the potentials are performed by adsorbing the acid or an organic acid or the base or an organic base in advance on the surfaces of the first oxide particles and by adjusting the surface potential of the first oxide particles and the surface potential of the second fine particles to the inverse potential.

For those performances, the acid can be exemplified by pyromellitic acid, maleic acid, phthalic acid or fumaric acid, and the base can be exemplified by alkyl ammonium, benzalkonium chloride and cholin chloride.

These so-called potential adjusting agents are mixed into either a reaction field for synthesizing the first oxide particles or a reaction field or solution for synthesizing the second fine particles thereby to adjust the surface potentials (or the zeta-potentials) of the individual particles in advance into the predetermined potentials which are determined in relation to the mating particles. In case, for example, the first oxide particles to become the carrier are to be synthesized by the microemulsion method, the suitable one of the aforementioned potential adjusting agents into the microemulsion liquid. Then, the potential adjusting agent is electrically adsorbed by the primary particles or the secondary particles of those oxide particles in the micelles (as may be called the inverse micelles, if they are of the w/o type), in which the first oxide particles or their precursors are synthesized, so that the zeta-potentials are inverted.

When a solution containing the second fine particles is mixed into that microemulsion liquid, the second fine particles are caused to migrate into the micelles containing the first oxide particles by the fusion (or coalescence) of the micelles. Since these particles have the potentials inverse to each other, the second fine particles are adsorbed homogeneously or densely by the surfaces of the first oxide particles. Alternatively, an aqueous solution containing a metal hydroxide to become the second fine particles is mixed into the microemulsion liquid in which the micelles containing the first oxide particles having the surface potential adjusted, thereby to produce the second fine particles or their precursors by the neutral co-precipitation in their interfaces or inside of the micelles. Then, the second fine particles or their precursors and the first oxide particles have the polarities inverse to each other so that the second fine particles or their precursors are instantly adsorbed by the surfaces of the first oxide particles by the electric action.

Here are exemplified the combinations of the first oxide particles and the second fine particles and the potential adjusting agents, which have similar charging characteristics. Pyromellitic acid can be employed as the potential adjusting agent, in case a ceria-zirconica composite oxide is to be adsorbed and carried as the second fine particles by yttria-zirconia composite oxide as the first fine particles. In this case, the pH value of the atmosphere is preset to about "6.5". Moreover, the pyromellitic acid can also be employed as the potential adjusting agent, in case a perovskite type lanthanum-strontium-iron-zirconium composite oxide is to be adsorbed and carried as the second fine particles by strontium-zirconium composite oxide as the first fine particles. In this case, the pH value of the atmosphere is preset from "9.7" to about "10.2". Still moreover, the benzalkonium chloride can also be employed as the potential adjusting agent, in case silica-titania is to be adsorbed and carried as the second fine particles by silica-alumina as the first fine particles. In this case, the pH value of the atmosphere is preset from "6.1" to about "6.4". These presentations are only for the exemplifications so that the potential adjusting agent and the atmosphere pH value are properly selected for the target particles.

The aforementioned adsorption process by the microemulsion method is schematically shown in FIG. 1. Specifically, FIG. 1 shows an example, in which the first oxide particles to become the carrier are prepared by the microemulsion method and in which the second oxide particles or the ultrafine particles are adsorbed by the first oxide particles. Micelles (or inverse micelles) 1 having an aqueous phase therein are dispersed in an organic solvent (e.g., oil) 2. In the aqueous phase inside of the micelles, primary particles 3 of a predetermined metal hydroxide or metallic oxide are produced by a hydrolysis and are agglomerated to produce secondary particles 4. These primary particles 3 or secondary particles 4 are the precursors of the aforementioned first oxide particles. The surface potentials of the aforementioned primary particles 3 or the secondary particles 4 are inverted by mixing a suitable acid or base in the state where the pH value of the aqueous phase in the micelles 1 is adjusted. If the first oxide particles or their precursor particles are the yttria-zirconia composite oxide or its precursor, for example, a saturated water solution of pyromellitic acid is added to adsorb its ions 7 thereby to charge the surfaces into the negative polarity. This state is schematically shown in an enlarged scale in FIG. 1.

Second fine particles 5 are mixed into the aqueous phase of the micelles 3, or the second fine particles 5 are produced in the micelles 3. In the example of FIG. 1, the raw liquid of the second fine particles 5 is mixed into the aforementioned microemulsion liquid thereby to form micelles (or inverse micelles) 6 containing the raw liquid in the aqueous phase. These micelles 6 collide against and fuse (or coalesce) into the aforementioned micelles 1 thereby to produce the second fine particles 5 in the aqueous phase containing the aforementioned first oxide particles or their precursor particles 3 and 4. This process is the neutral co-precipitation, for example. Into the aforementioned aqueous phase of the micells 1, therefore, there are mixed in advance the ions which will cause a neutralization reaction with the aforementioned raw liquid. In case the ceria-zirconia composite oxide is used as the second fine particles, for example, ammonia is dissolved in the aforementioned micelles 1.

Figure 2:
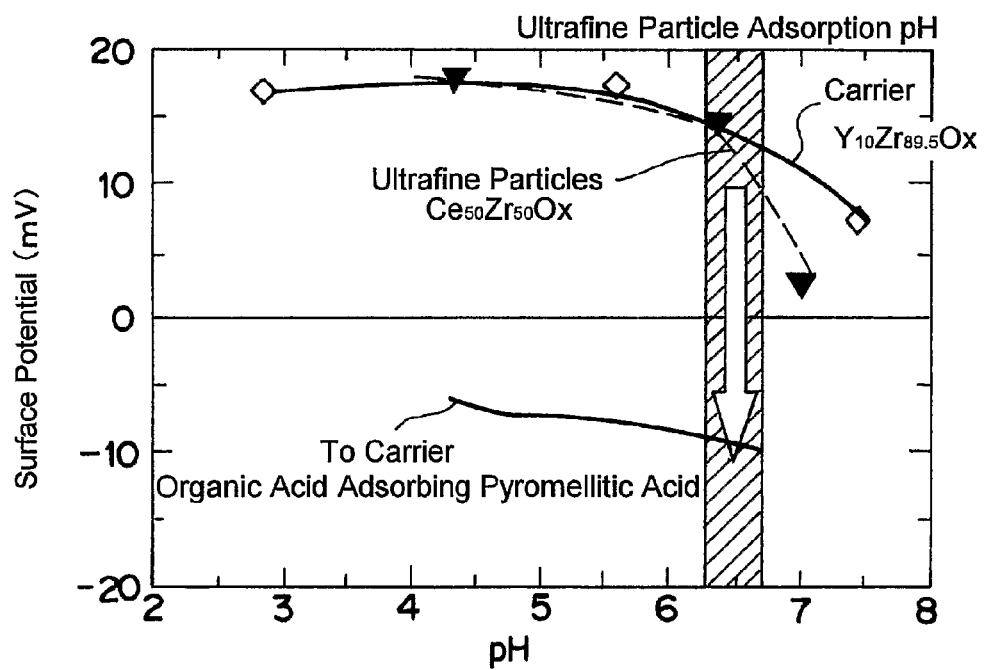
FIG. 2 is a graph plotting the charging characteristics of yttria-zirconia particles for a carrier or their precursor particles and ultrafine particles of ceria-zirconia or their precursors, and the results of potential adjustments by pyromellitic acid.
Figure 3:
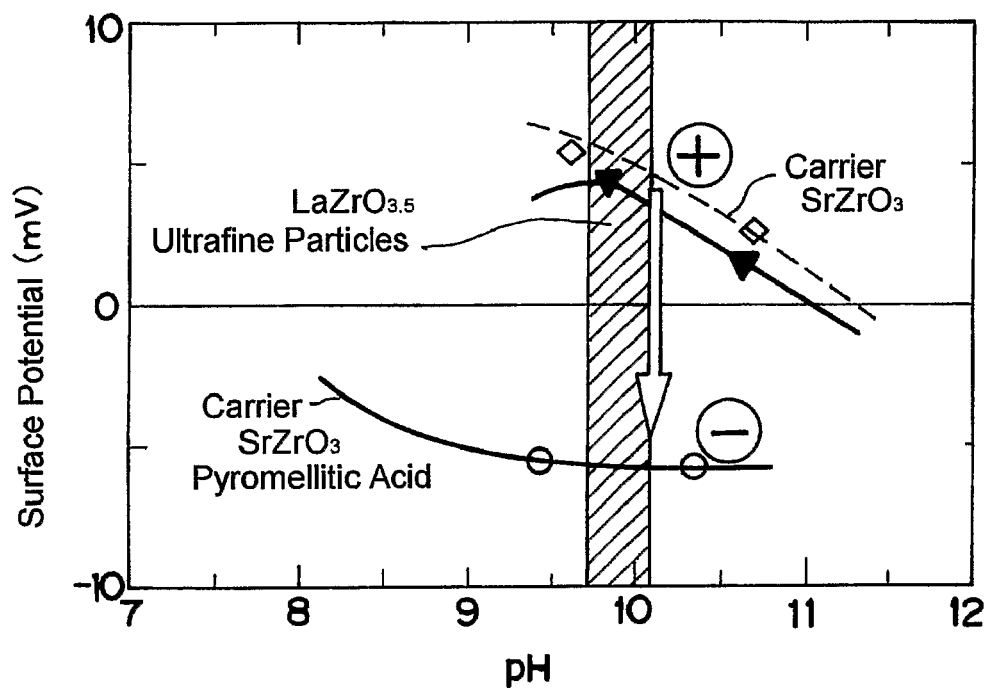
FIG. 3 is a graph plotting the charging characteristics of strontium-zirconia particles for a carrier or their precursor particles and ultrafine particles of lanthanum-zirconium or their precursors, and the results of potential adjustments by pyromellitic acid.

The surface potential of the first oxide particles or their precursor particles 3 and 4 is adjusted by the acid or base to have the potential inverse to that of the second fine particles 5. Therefore, the second fine particles 5 are adsorbed by the electric attraction onto the surfaces of the first oxide particles or their precursor particles 3 and 4. For example, either the charging characteristics of the yttria-zirconia composite oxide particles to become the carrier and the ceria-zirconia composite oxide particles or the fine particles to be carried by the former, or the charging characteristics of the precursors of those particles are similar to each other, as shown in FIG. 2, and exhibit that the zeta-potentials take the plus polarity. If pyromellitic acid is adsorbed, as described above, the surface potential of the yttria-zirconia composite oxide particles or their precursor particles is inverted to the minus polarity. As a result, the second fine particles 5 are adsorbed by the electric action onto the surfaces of the first oxide particles or their precursor particles 3 and 4.

In this case, the second fine particles 5 are so adsorbed as to bury the portions charged to the minus polarity in the surfaces of the particles 3 and 4 or the precursors of the first oxide particles. As a result, the second fine particles 5 can also be densely adsorbed to establish the homogeneous phase. The particles 4 having adsorbed the second fine particles 5 thus prepared are sintered after the known rinsing and drying steps into the compound oxide particles or the compound oxide particle powder.

The compound oxide thus prepared does not need the step of dissolving the first oxide particles, after formed, to become its carrier so that the first oxide particles constituting the carrier have a strong bonding force. As a result, the compound oxide is hardly deteriorated, even if exposed to a high temperature of about 600 to 900° C., so that it becomes a compound oxide of a high heating resistance. On the other hand, the second oxide particles are adsorbed by the electric attractions onto the surfaces of the first oxide particles, and are subjected in that state to the rinsing, drying and sintering treatments. Therefore, the second oxide particles are hardly migrated, and accordingly hardly have an offset location or a concentration deviation. In the case of the compound oxide to be employed as the catalyst, therefore, the second active oxide particles can be homogeneously carried to provide a catalyst of an excellent performance.

EXAMPLE 1

Example of $La_{0.035}Ce_{0.4}Zr_{0.565}O_{1.9825}$ (25 wt. %)/$Y_{0.1}Zr_{0.9}O_{1.95}$)

First of all, liquids of the following four kinds (i.e., a microemulsion liquid for a carrier, a microemulsion liquid for fine particles, a zirconium alkoxide solution and a saturated pyromellitic acid) were prepared.

At first, 430 ls of cyclohexane and 16 Kg of polyoxyethylene (n=5) nonylphenyl ether were agitated and mixed in a reactor of 1000 ls. To this mixture, there were added 12 ls of an aqueous solution, in which 2.6 mols of yttrium nitrate, 12 mols of zirconium oxynitrate and 39 mols of ammonium nitrate had been dissolved. The resultant solution was sufficiently agitated at the room temperature. As a result, the inverse micelles (i.e., the water-in-oil type microemulsion having a water droplet diameter of 30 nm) were formed to prepare the carrier microemulsion liquid.

Next, 75 ls of cyclohexane and 17 Kg of polyoxyethylene (n=5) nonylphenyl ether were mixed and sufficiently agitated in another reactor of 150 ls. To this mixture, there were added 6 ls of aqueous solution, in which 0.19 mols of lanthanum nitrate, 2.2 mols of cerium nitrate and 3.1 mols of zirconium oxynitrate had been dissolved. As a result, inverse micelles (e.g., an water-in-oil type microemulsion having a water droplet internal diameter of 3 nm) were produced to prepare a microemulsion for ultrafine particles.

Separately of this, there was prepared a zirconium alkoxide solution, in which 12 mols of zirconium-n-butoxide was dissolved in 80 ls of cyclohexane.

Moreover, a sufficient amount of pyromellitic acid was dissolved, while being agitated, in hot water and was cooled to the room temperature to prepare a saturated pyromellitic acid solution.

Next, a compound oxide precursor was synthesized by a hydrolytic reaction.

At first, the zirconium alkoxide solution and ammonia water were added, while being agitated, into the microemulsion liquid for the carrier, thereby to adjust the pH value to 6.5, and the hydrolysis was started. After one minute, a yttria-zirconia composite oxide precursor was produced, and 6.7 ls of an aqueous solution of saturated pyromellitic acid and ammonia water were added to that mixture to adjust the pH to 6.5. At this time, the pyromellitic oxide was adsorbed by the surfaces of the yttria-zirconia composite oxide precursors to charge the surfaces to the minus polarity. This corresponds to the operation to adjust the potential by adsorbing an organic acid. Moreover, excessive ammonium ions existed in the aqueous phase. After one minute, moreover, the microemulsion liquid for fine particles was added, while being agitated, to the mixed liquid of the carrier microemulsion liquid and the zirconium alkoxide solution thereby to deposit the $La_{0.035}Ce_{0.4}Zr_{0.565}O_{1.9825}$ fine particle precursors by a neutralization reaction with the ammonium ions. Under this condition, the surfaces of the fine particle precursors of $La_{0.035}Ce_{0.4}Zr_{0.565}O_{1.9825}$ were charged to the plus polarity, and the surfaces of fine particle precursors of yttria-zirconia composite oxide formed by the hydrolysis were charged to the minus polarity, so that the $La_{0.035}Ce_{0.4}Zr_{0.565}O_{1.9825}$ fine particle precursors were adsorbed for a short time period by the yttria-zirconia composite oxide precursors. Next, 14 ls of water were added, and the liquid was aged, while being agitated, for about one hour.

The mother liquid was filtered, and the precipitate obtained was rinsed three times with ethanol, dried at 80° C. for one night, and then sintered in the atmosphere at 600° C. for two hours to obtain $La_{0.035}Ce_{0.4}Zr_{0.565}O_{1.9825}$ (25 wt. %)/$Y_{0.1}Zr_{0.9}O_{1.95}$.

EXAMPLE 2

Example of Carrying Ultrafine Particles of $LaZr_{3.5}$

First of all, liquids of the following four kinds (i.e., a microemulsion liquid for a carrier, a microemulsion liquid for fine particles, a zirconium alkoxide solution, and a saturated pyromellitic solution) were prepared.

At first, 5.74 ls of cyclohexane and 214 g of polyoxyethylene (n=5) nonylphenyl ether were poured into a reactor of 15 ls and were agitated and mixed. To this mixture, there were added 0.12 ls of an aqueous solution, in which 0.18 mols of strontium nitrate, and 0.127 mols of ammonium nitrate had been dissolved. The resultant solution was sufficiently agitated at the room temperature. As a result, the inverse micelles (i.e., the water-in-oil type microemulsion having a water droplet diameter of 30 nm) were formed to prepare the carrier microemulsion liquid.

Next, 0.75 ls of cyclohexane and 171 g of polyoxyethylene (n=5) nonylphenyl ether were mixed and sufficiently agitated in another reactor of 2 ls. To this mixture, there were added 60 ml of an aqueous solution, in which 0.0692 mols of lanthanum nitrate and 0.0692 mols of zirconium oxynitrate had been dissolved. The resultant solution was sufficiently agitated at the room temperature. As a result, inverse micelles (e.g., an water-in-oil type microemulsion having a water droplet diameter of 3 nm) were produced to prepare a microemulsion liquid for fine particles.

Separately of this, there was prepared a zirconium alkoxide solution, in which 0.145 mols of zirconium-n-butoxide was dissolved in 0.8 ls of cyclohexane.

Moreover, a sufficient quantity of pyromellitic acid was dissolved, while being agitated, into hot water, and was cooled to the room temperature to prepare a saturated pyromellitic acid solution.

Next, a compound oxide precursor was synthesized by a hydrolytic reaction.

At first, the zirconium alkoxide solution and ammonia water were added, while being agitated, into the microemulsion liquid for carrier, thereby to adjust the pH value to 9.8, and the hydrolysis was started. After three minutes, strontium-zirconia carrier secondary particles were produced, and 30 ml of an aqueous solution of saturated pyromellitic acid and ammonia water were then added to that mixture solution thereby to adjust the pH value to 9.8. At this time, the pyromellitic acid was adsorbed by the surfaces of the strontium-zirconia carrier secondary particles to charge the surfaces to the minus polarity. This corresponded to the operation to adjust the potential by adsorbing an organic acid. Moreover, excessive ammonium ions existed in the aqueous phase. Moreover, the aforementioned ultrafine particle synthesizing microemulsion (of a water droplet diameter of 3 nm), in which lanthanum nitrate and zirconium oxynitrate had been dissolved in the aqueous phase, was mixed to contact with the microemulsion (of a water droplet diameter of 30 nm) containing the strontium-zirconium composite oxide precursor secondary particles having adsorbed pyromellitic acid and charged to the minus polarity. As a result, the lanthanum-zirconium precursor ultrafine particles produced by the neutralization reaction were adsorbed on the minus-charged strontium-zirconium precursor secondary particles.

After this, the filtering, rinsing, drying and sintering operations were performed like Embodiment 1 to produce the lanthanum-zirconium ultrafine particles adsorbed strontium-zirconium.

EXAMPLE 3

Example of Charging the Carrier to Plus

First of all, liquids of the following four kinds (i.e., a microemulsion liquid for a carrier, a solution for fine particles, a zirconium alkoxide solution, and a benzalkonium chloride solution) were prepared.

At first, 5.74 ls of cyclohexane and 214 g of polyoxyethylene (n=5) nonylphenyl ether were poured into a reactor of 15 ls and were agitated and mixed. To this mixture, there were added 0.12 ls of an aqueous solution, in which 0.145 mols of aluminum nitrate had been dissolved. The resultant solution was sufficiently agitated at the room temperature. As a result, the inverse micelles (i.e., the water-in-oil type microemulsion having a water droplet diameter of 30 nm) were formed to prepare the microemulsion liquid for the carrier.

Next, a protector was worn, and an aqueous solution of 10 wt. % of titanium chloride (III) was prepared. This aqueous solution was dropped like Example 2 into a polyoxyethylene (n=5) nonylphenyl ether/cyclohexane and was sufficiently agitated to produce a microemulsion liquid of a water droplet inner diameter of about 5 nm.

Separately of this, there was prepared a silica alkoxide solution, in which 0.145 mols of tetraethoxy silane (TEOS) was dissolved in 0.8 ls of cyclohexane.

Moreover, a sufficient quantity of benzalkonium chloride (alkyldimethylbenzylammonium) was dissolved, while being agitated, into hot water, and was cooled to the room temperature to prepare a benzalkonium chloride solution.

Next, a compound oxide precursor was synthesized by a hydrolytic reaction.

At first, the silica alkoxide solution and ammonia water were added, while being agitated, into the microemulsion liquid for the carrier, thereby to adjust the pH value to 6.2, and the hydrolysis was started. After three minutes, silica-alumina carrier secondary particles were produced, and 26 ml of a benzalkonium chloride solution and ammonia water were then added to that mixture solution thereby to adjust the pH value to 6.2. At this time, the benzalkonium chloride was adsorbed by the surfaces of the silica-alumina carrier secondary particles to charge the surfaces to the minus polarity. This corresponded to the operation to adjust the potential by adsorbing an organic acid.

After one minute, moreover, the microemulsion liquid for particles was added, while being agitated, to the mixed liquid of the carrier microemulsion liquid and the silica alkoxide solution thereby to mix the precursor of titania ultrafine particles into the micelles (or inverse micelles) containing silica-alumina carrier secondary particles. Under this condition, the surfaces of the titania ultrafine particles were charged to the minus polarity, but the silica-alumina carrier secondary particles to become the carrier were charged to the plus polarity by adsorbing the benzalkonium chloride, so that the titania fine particle precursors were adsorbed for a short time by the silica-alumina carrier secondary particles. Next, 120 ml of water was added, and the liquid was aged, while being agitated, for about two hours.

The mother liquid was filtered, and the precipitate obtained was rinsed three times with ethanol, dried at 80° C. for one night, and then sintered in the atmosphere at 600° C. for five hours to obtain silica-alumina composite oxide powder carrying the fine particles of titania.

Figure 4:
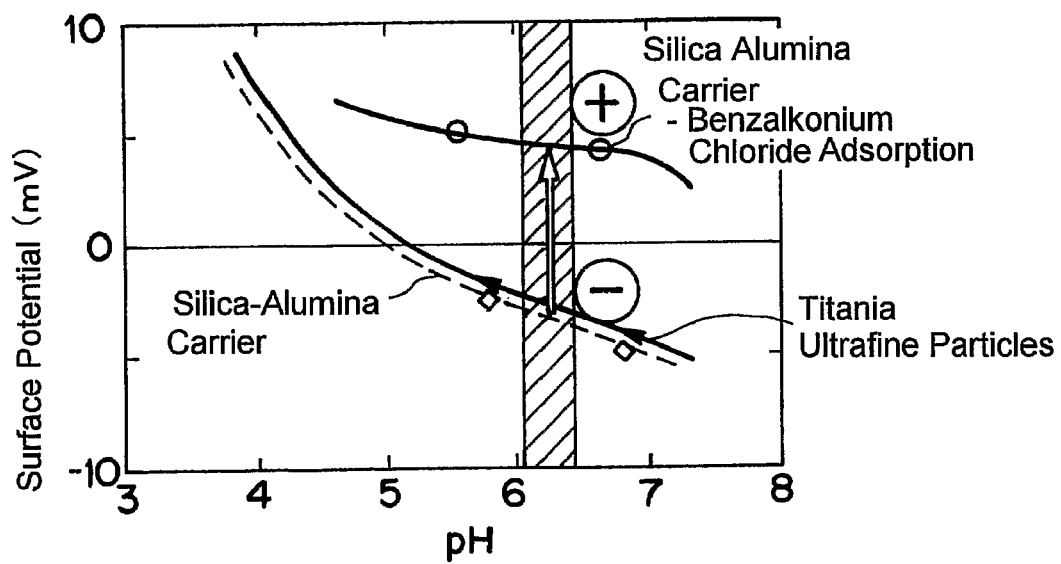
FIG. 4 is a graph plotting the charging characteristics of silica-alumina particles for a carrier or their precursor particles and ultrafine particles of titania or their precursors, and the results of potential adjustments by benzalkonium chloride.

Here, the charging characteristics of the silica-alumina composite oxide and the charging characteristics of the titania ultrafine particles are similar to each other, as shown in FIG. 4. At the aforementioned pH value of about "6.2", however, the silica-alumina carrier secondary particles are charged to the positive polarity by adsorbing a base such as the benzalkonium chloride, so that the aforementioned titania ultrafine particles are adsorbed by the electric action on the surfaces of the silica-alumina carrier secondary particles.

COMPARISON 1

In contrast to Example 1, the neutralization precipitation method of the prior art was used to synthesize $La_{0.035}Ce_{0.4}Zr_{0.565}O_{1.9825}$ (25 wt. %)/$Y_{0.1}Zr_{0.9}O_{1.95}$.

First of all, the zirconia used to become the base carrier was synthesized by the so-called pH swing neutralization precipitation method. At first, a precursor precipitate was obtained by adding ammonia to a 1M aqueous solution of zirconium oxynitrate to set the pH value at "8". Next, the pH value of the precursor was adjusted to "6.5" by adding nitric acid to the precursor, and this adjusted precursor was agitated for one week. After this, ammonia was added again to return the pH value to "8" thereby to prepare the precipitate. This precipitate was rinsed, dried and sintered at 600° C. by the conventional procedure thereby to produce a zirconia carrier having pores. This was caused by the ordinary method to absorb and carry an aqueous solution of yttrium nitrate was absorbed and carried in the base carrier, and was dried and sintered at 600° C. for two hours to produce $Y_{0.1}Zr_{0.9}O_{1.95}$.

Next, this carrier was made to absorb an aqueous solution, in which aqueous solutions of lanthanum nitrate, cerium nitrate and zirconium oxynitrate had been mixed at ratios of $La_{0.035}Ce_{0.4}Zr_{0.565}$. The carrier thus made was dried and sintered at 600° C. for two hours to produce a compound oxide having a composition of $La_{0.035}Ce_{0.4}Zr_{0.565}O_{1.9825}$ (25 wt. %)/$Y_{0.1}Zr_{0.9}O_{1.95}$.

[Evaluation]

Figure 5:
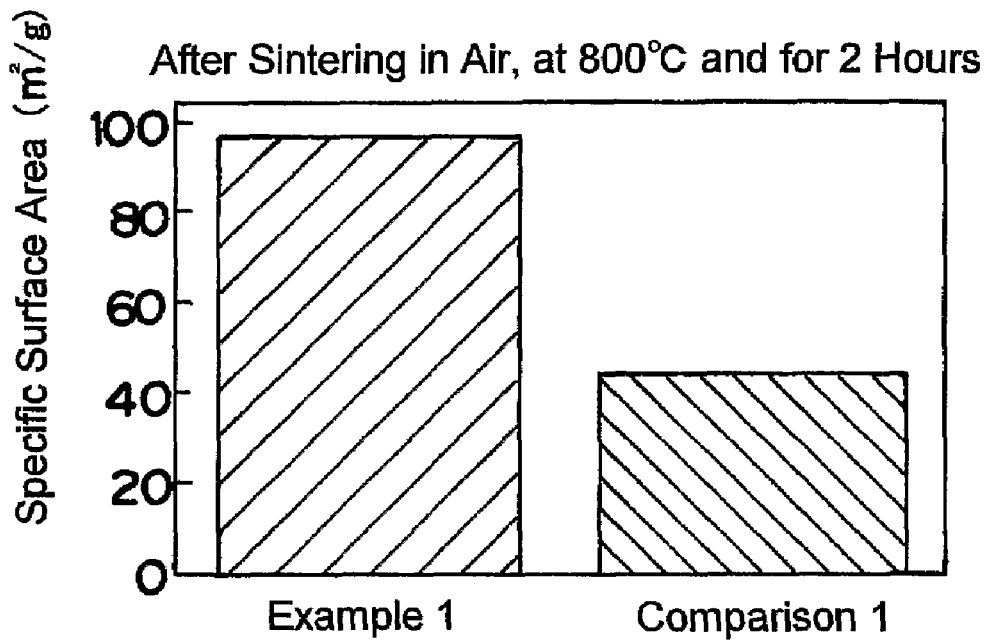
FIG. 5 is a diagram showing the measurement results of specific areas of the composite oxide obtained in Example 1 of this invention and the composite oxide according to Comparison 1 after they were sintered in the air at 800° C. for two hours.

Next, the superiority of Example 1 is described in contrast to Comparison 1. FIG. 5 shows the carrier surface areas at the time of sintering at 800° C. Example 1 had a specific surface area larger by twice or more than that of Comparison 1 so that it had an apparent heat-resistance improving effect. This effect is estimated from that, in Comparison 1, nitrate adhered to the $Y_{0.1}Zr_{0.9}O_{1.95}$ carrier so that the solid phase reaction was promoted at the drying and sintering time to make the surface area smaller, whereas, in Example 1, not the nitrate but ultrafine particles of $La_{0.035}Ce_{0.4}Zr_{0.565}O_{1.9825}$ were adsorbed by the $Y_{0.1}Zr_{0.9}O_{1.95}$ carrier so that the solid phase reaction was minimized.

Figure 6:
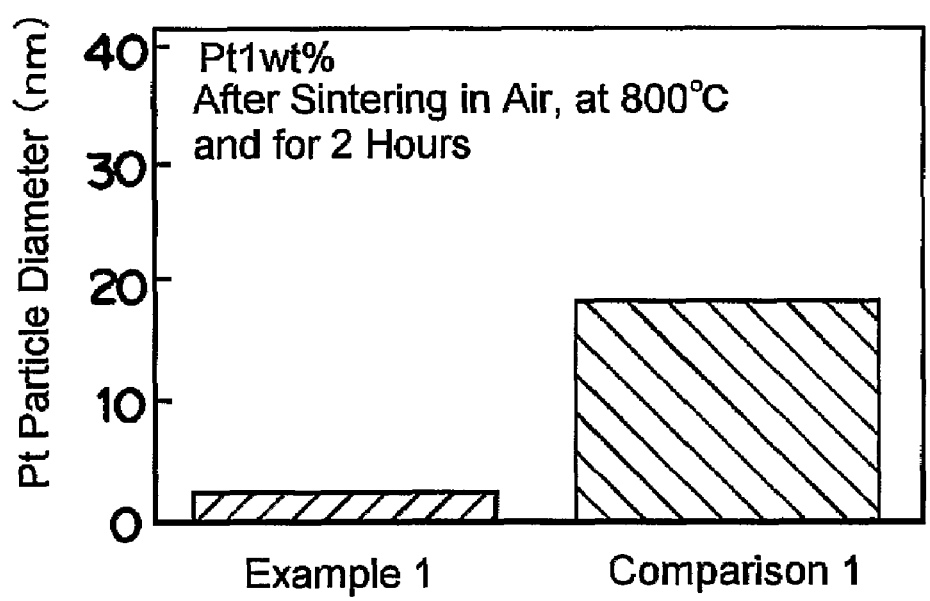
FIG. 6 is a diagram showing the measurement results of particle diameters of Pt particles carried, after sintered, on the composite oxide of Example 1 and the composite oxide according to Comparison 1.

On the other hand, the Pt particle diameter at the time when those carriers had been caused to carry 1 wt. % of Pt and sintered in the air at 800° C. for two hours was measured by the X-ray diffraction method. The results are shown in FIG. 6. In Example 1, the Pt particles were the lower measurement limit of about 2 nm, whereas, in Comparison 1, the Pt particles were sintered to become coarser to 18 nm.

This difference arose depending on whether or not Ce had suppressed the sintering of the Pt particles, although the interaction between Ce and Pt was basically so strong that Ce suppressed the migration of the Pt particles. In Comparison 1, however, the solid phase reaction of the nitrate with the base carrier at the sintering time was so high but not the charge composition that the surface Ce concentration dropped thereby to make the suppressing action of the sintering of the Pt particles insufficient. In Example 1, on the other hand, it is estimated that the Ce was adsorbed as the ultrafine particles so that the solid phase reaction at the sintering time was minimized to keep the surface Ce concentration thereby to cause the sintering suppression of the Pt particles.

COMPARISON 2

In contrast to Example 2, the neutralization precipitation method of the prior art was used to synthesize $LaZrO_{3.5}$/$SrZrO_3$.

Like the aforementioned Comparison 1, a zirconia used for the base carrier was synthesized by the so-called pH swing neutralization precipitation method, and was caused to absorb and carry an aqueous solution of strontium nitrate. The base carrier was dried and sintered at 600° C. for two houses to obtain a $SrZrO_3$ carrier.

Next, this carrier was made to absorb an aqueous solution, in which aqueous solutions of lanthanum nitrate, cerium nitrate and zirconium oxynitrate had been mixed at ratios of $La_{0.035}Ce_{0.4}Zr_{0.565}$. The carrier thus made was dried and sintered at 600° C. for two hours to produce a compound oxide having a composition of $LaZrO_{3.5}$/$SrZrO_3$.

[Evaluation]

Figure 7:
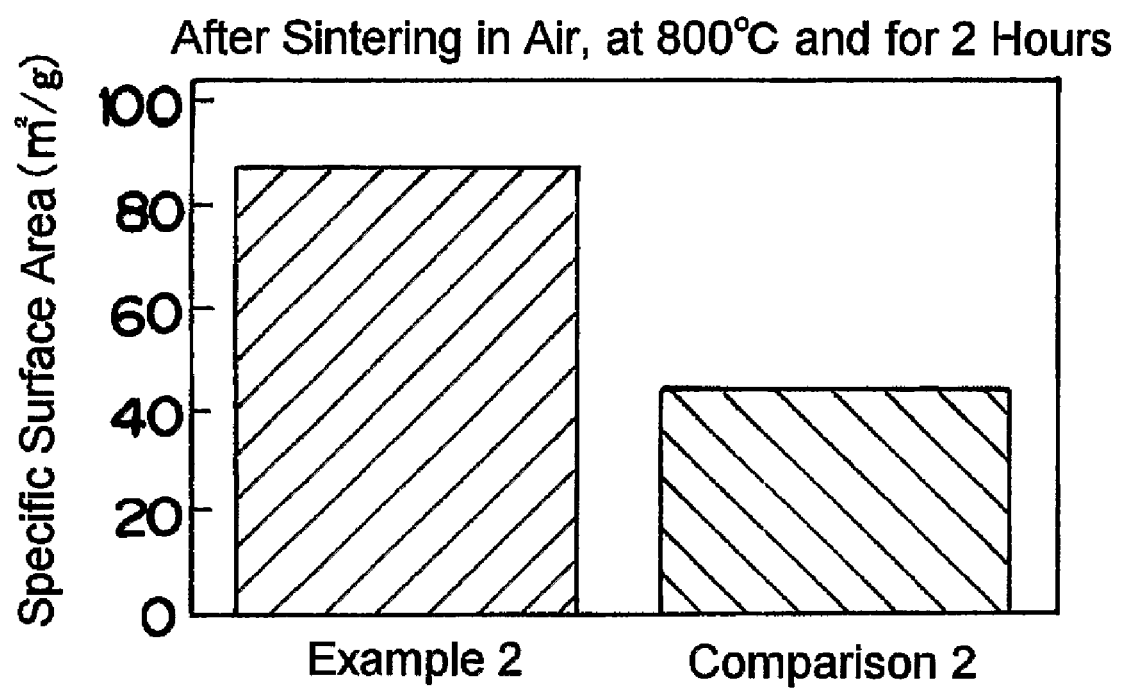
FIG. 7 is a diagram showing the measurement results of specific areas of the composite oxide obtained in Example 2 of this invention and the composite oxide according to Comparison 2 after they were sintered in the air at 800° C. for two hours.

Next, the superiority of Example 2 is described in contrast to Comparison 2. FIG. 7 shows the carrier surface areas at the time of sintering at 800° C. Example 2 had a specific surface area larger by twice or more than that of Comparison 2 so that it had an apparent heat-resistance improving effect. This effect is estimated from that, in Comparison 2, nitrate adhered to the $SrZrO_3$ carrier so that the solid phase reaction was promoted at the drying and sintering time to make the surface area smaller, whereas, in Example 2, not the nitrate but ultrafine particles of $LaZrO_{3.5}$ were adsorbed by the $SrZrO_3$ carrier so that the solid phase reaction was minimized.

COMPARISON 3

The synthesization of 15 wt. % titania ultrafine particle adsorbed silica alumina was tried on Example 3 by using the neutralization precipitation method of the prior art.

At first, a silica-alumina carrier was synthesized by the ordinary method. The synthesized carrier was then caused to adsorb a solution of 0.5 mols/l titanium chloride (III), and was dried and sintered. However, the subsequent increase in the weight was extremely small to have a carriage of about 1 wt. %. This implies that the conventional method cannot synthesize and obtain the titania carriage aimed at.

Thus, Example 3 can synthesize even the compositions which could not be made in the prior art, so that it can synthesize a composite oxide of such a high function as has never been produced.

The invention claimed is:

1. A method for producing a heat-resisting compound oxide in which first oxide particles are made to carry second oxide particles having near charging characteristics, the method comprising in order:

synthesizing the first oxide particles or their precursor particles within micelles, the micelles having an aqueous phase therein and being dispersed in a solvent;

charging said first oxide particles or their precursor particles within the micelles to a potential inverse to that of the second oxide particles or their precursor particles to be synthesized, when the first oxide particles or their precursor particles absorb an acid or base in the micelles;

synthesizing second oxide particles or their precursor particles within the micelles;

absorbing the second oxide particles on the first oxide particles within the micelles; and sintering the first oxide particles so that the first oxide particles carry the second oxide particles, wherein the second oxide particles or their precursor particles have a smaller diameter than the first oxide particles or their precursor particles and have charging characteristics similar to charging characteristics of the first oxide particles.

2. The method for producing a heat-resisting compound oxide as set forth in claim 1, wherein:

said first oxide particles and said second oxide particles having surface potentials similar to each other at every pH value.

3. The method for producing a heat-resisting compound oxide as set forth in claim 1, wherein:

said first oxide particles contain any of zirconia, alumina, silica-alumina, a lanthanum-yttria-zirconia composite oxide, a yttria-zirconia composite oxide, a lanthanum-zirconia composite oxide and a cerium-zirconium composite oxide; and said second oxide particles contain any of a perovskite type lanthanum-strontium-iron-zirconium composite oxide, a silica-titania composite oxide, a fluorite type lanthanum-cerium-zirconium compound oxide.

4. The method for producing a heat-resisting compound oxide as set forth in claim 3, wherein:

said first oxide particles have a porous structure obtained by mutually agglomerating secondary particles which have been agglomerated from synthesized primary particles.

5. The method for producing a heat-resisting compound oxide as set forth in claim 1, wherein:

said acid is an organic acid; and said base is an organic base.

6. The method for producing a heat-resisting compound oxide as set forth in claim 5, wherein:

said organic acid contains any of pyromellitic acid, maleic acid, phthalic acid and fumaric acid; and said base contains any of alkyl ammonium, benzalkonium chloride and cholin chloride.

* * * * *